Jan. 3, 1950  S. R. GREEN  2,493,133
SCALE PROJECTION MEANS FOR WEIGHING BALANCES
Filed Dec. 23, 1947
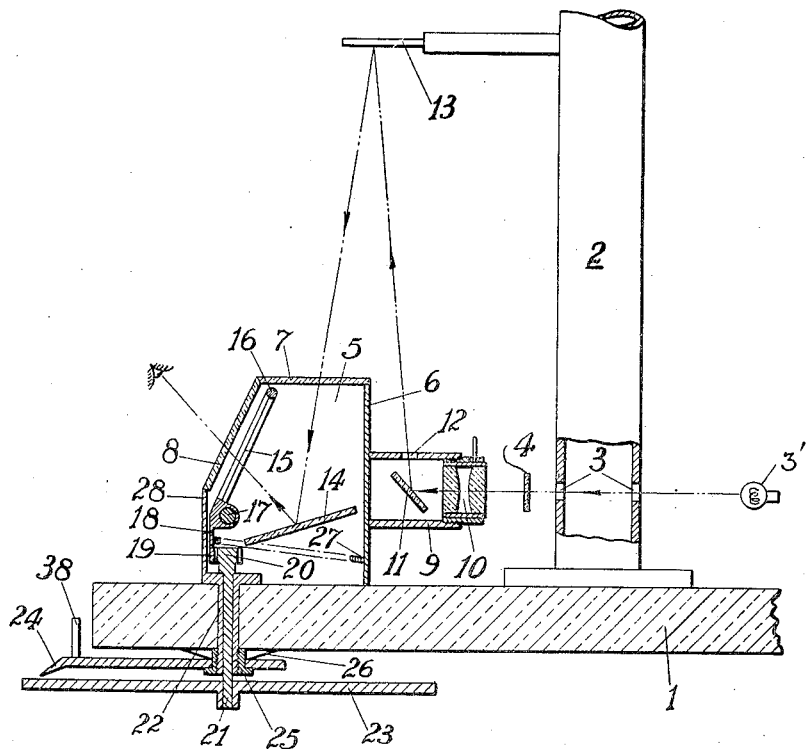
Inventor
S. R. Green
By Hancock Downey Subb
Attys.

Patented Jan. 3, 1950

2,493,133

UNITED STATES PATENT OFFICE 2,493,133

SCALE PROJECTION MEANS FOR WEIGHING BALANCES

Sydney Rayner Green, Barkingside, Ilford, England

Application December 23, 1947, Serial No. 793,366
In Great Britain May 27, 1946

Section 1, Public Law 690, August 8, 1946
Patent expires May 27, 1966

6 Claims. (Cl. 88—24)

1

This invention relates to weighing balances more particularly of the type for accurate weighing such as fine balances, projected scale, aperiodic or delicate balances.

In balances of the type in question there are a number of features which are not altogether satisfactory in practice and it is the object of the present invention to provide various improvements by which such disadvantages are eliminated.

It has been the practice hitherto to mount the viewing screen at the upper part of the case. Such position is rather inconvenient and one object of the present invention is to provide an improved arrangement of the scale projecting means whereby the screen may be located at the base or pan level.

On known viewing screens it is usual to engrave a vernier scale on the screen for the purpose of subdividing projected division of the scale. Such verniers are somewhat difficult to read and it is a further object of the invention to provide improved micrometer reading means which are located apart from the screen so that they may be read with ease.

Further, in known means for adjusting the index line on the screen such have been arranged at the top of the case and a further object of the present invention is to provide adjusting means operable from the base position giving quicker and easier manipulation.

According to one feature of the invention the viewing screen assembly is located at the base of the cage and the scale projection means include reflecting means whereby the scale is projected downwardly on to the screen assembly.

According to another feature improved vernier means providing sub-divisions of a division projected on the screen are mounted adjacent the screen assembly and preferably below the case and are operatively geared to the index line.

The vernier means may comprise a rotary dial or disc having ten equal graduations corresponding to one projected division on its upper face and a zero indicating arm or finger coaxial with the dial.

The rotary dial may be used for zero setting the index line as seen on the screen and the indicating arm may be frictionally controlled in its adjustments.

In the accompanying drawings:

The figure is a sectional side elevation of the improved viewing screen assembly according to the invention.

In carrying the invention into effect according

2 to one convenient mode by way of example, a base 1 formed of glass or other suitable material is provided at the rear with a hollow support or pillar 2 by which the beam and scale system is supported in known way. Adjacent the lower end the pillar is perforated at 3 so that a beam of light from a suitable source located to the rear of the pillar will pass through on to a graticule 4.

Adjacent the front of the base a viewing screen assembly is provided comprising a box or casing 5 having a metal rear wall 6, an upper plain glass top 7 and a forward sloping matt glass screen 8. The rear wall 6 supports a tube 9 at the level of the graticule and in which a suitable magnifying lens system 10 is carried. Within the tube an adjustable angle mirror 11 is provided by which a magnified image of the illuminated portion of the graticule is reflected upwardly through an aperture 12 in the tube and on to a mirror 13 which is supported by the pillar 2.

From the upper mirror 13 the image is reflected downwardly through the plain glass top 7 of the screen box and on to an adjustable angle mirror 14 located within the box. The image is reflected from this mirror 14 on to the sloping matt screen 8.

Located to the rear of the screen 8 and parallel to the plane thereof is an index wire 15 which is supported in a suitable frame 16 carried by a horizontal bar 17 so that it may slide thereon. The frame or a part 18 secured thereto depends vertically downward and such part carries a rack 19 with which a pinion 20 meshes. The pinion 20 is secured to the upper end of a spindle 21 which has bearing means 22 extending through the glass base 1.

At its lower end and beneath the base 1 the spindle 21 carries a disc or dial 23 by which the spindle may be rotated and through the pinion 20 and rack 19 cause the index line 15 to be adjusted across the screen 8.

Between the disc 23 and the under surface of the base 1 a rotary indicating or zero arm 24 is mounted by means of a sleeve 25 which is screwed upon the spindle bearing means 22. The indicating arm 24 is freely rotatable on the sleeve 25 and is held stationary frictionally by means of a suitable spring 26 between the arm and the base.

The indicating arm 24 at its outer end is inclined downwardly into close proximity to the upper surface of the disc. The arm is also provided with an upstanding peg 38 by which it may be moved about its pivot.

The rotary disc 23 and indicating arm 24 are adapted to provide vernier means by which sub-division of the projected divisions of the graticule 4 appearing on the screen 8 may be read with accuracy and ease.

For this purpose the disc 23 is provided with ten equal graduations upon its upper surface adjacent its rim so that they may readily be viewed from above. The gear ratio between the disc 23 and the index line rack 19 is such that the movement of the index line 15 one projected division conforms to a movement of ten divisions of the disc 23 relatively to the indicating arm or pointer 24.

By means of the rotary disc 23 the zeroising of the index line 15 may be readily effected and in combination with the indicating arm 24 the appropriate sub-divisions of a projected division may readily be determined by moving the indexing line 15 after a weighing operation and reading off the divisions on the disc against the indicating arm or pointer.

In order to avoid backlash between the rack 19 and pinion 20 a spring 27 may be provided secured at one end to the part 18 and at the other to the rear wall 6. As an alternative a flat spring may be provided between the part 18 and the front wall 28 of the casing 5.

According to a modified form the disc 23 and arm may be dispensed with and a knob mounted upon the spindle 21.

Although it is preferred to reflect the image of the scale downwardly on to the screen assembly, by a suitable arrangement of mirrors it may be reflected upwardly through the lower part of the rear wall which would be formed of plain glass for the purpose.

I claim:

1. In a weighing balance of the type described, comprising a scale system including a beam, a graticule carried by the beam, a case including a supporting base, a viewing screen assembly located at and supported on said base, said assembly comprising a casing having a rear wall, a screen mounted in said casing, a lens tube mounted on said rear wall and in front of said graticule, a lens system mounted in said lens tube, adjustable mirrors in said tube and said casing, means for illuminating the graticule whereby an image of the graticule formed by said lens system is reflected by said mirrors on to the screen by the aid of a mirror located at the upper part of said case.

2. A weighing balance as claimed in claim 1, wherein a frame is located in the casing at the rear of the screen, said frame having an index line and means for adjusting the frame along a horizontal axis, vernier means located beneath the supporting base, and means coupling the vernier means with the adjusting means.

3. A weighing balance as claimed in claim 2, wherein the frame is mounted for sliding movement on a horizontal bar secured to the casing, said frame having a rack meshing with a pinion operatively connected to the vernier means.

4. A weighing balance as claimed in claim 3, wherein a spindle extends through the base and said pinion is secured to the upper end thereof, the lower end of the spindle being secured to a dial having vernier divisions on its upper surface, and a zero indicating arm coaxial with the spindle.

5. A weighing balance as claimed in claim 4, wherein a bearing sleeve extends through the base and forms a bearing for the spindle, said zero indicating arm being mounted for rotation on the lower end of the sleeve, and friction means for holding the arm in its adjusted position.

6. In a weighing balance of the type described comprising a scale system including a beam, a graticule carried by the beam, a supporting base, a viewing screen assembly including a screen located at and supported on said base, a lens system for projecting an image of said graticule onto said screen an index line located adjacent the screen, means for moving the index line across the screen, vernier means located beneath and supported by said base, and means coupling the vernier means and said means for moving the index line.

SYDNEY RAYNER GREEN.

REFERENCES CITED

The following references are of record in the file of this patent:

UNITED STATES PATENTS

| Number | Name | Date |
|---|---|---|
| 1,357,731 | Schaper | Nov. 2, 1920 |
| 1,437,768 | McIntosh | Dec. 5, 1922 |
| 1,502,443 | Schaper | July 22, 1924 |
| 1,562,936 | Ainsworth | Nov. 24, 1925 |
| 1,655,386 | Craig | Jan. 3, 1928 |
| 1,706,966 | Reeves et al. | Mar. 26, 1929 |
| 1,721,398 | Jacob | July 16, 1929 |
| 1,834,848 | Krayer | Dec. 1, 1931 |
| 1,856,411 | Carroll | May 3, 1932 |
| 2,217,244 | Williams | Oct. 8, 1940 |
| 2,305,775 | Hansen | Dec. 22, 1942 |
| 2,322,813 | Beck | June 29, 1943 |
| 2,350,622 | Katz | June 6, 1944 |